(12) United States Patent
Konishi

(10) Patent No.: US 7,438,311 B2
(45) Date of Patent: Oct. 21, 2008

(54) HOSE FOR INTRODUCTION AND DISTRIBUTION OF INFLATOR GAS

(75) Inventor: Tatsuo Konishi, Osaka (JP)

(73) Assignees: Toyo Boseki Kabushiki Kaisha, Osaka (JP); Autoliv Development AB, Vargarda (SE)

( * ) Notice: Subject to any disclaimer, the term of this patent is extended or adjusted under 35 U.S.C. 154(b) by 0 days.

(21) Appl. No.: 11/596,323

(22) PCT Filed: May 11, 2005

(86) PCT No.: PCT/JP2005/008586

§ 371 (c)(1), (2), (4) Date: Nov. 13, 2006

(87) PCT Pub. No.: WO2005/110821

PCT Pub. Date: Nov. 24, 2005

(65) Prior Publication Data

US 2008/0001385 A1    Jan. 3, 2008

(30) Foreign Application Priority Data

May 13, 2004    (JP)    ............................ 2004-143658

(51) Int. Cl.
*B60R 21/16* (2006.01)
*B60R 21/213* (2006.01)
*B60R 21/237* (2006.01)

(52) U.S. Cl. ................................... 280/730.2; 280/742

(58) Field of Classification Search .............. 280/730.2, 280/743.1, 742, 743.2, 740
See application file for complete search history.

(56) References Cited

U.S. PATENT DOCUMENTS

| 6,199,898 | B1 * | 3/2001 | Masuda et al. | ............ 280/730.2 |
| 7,246,818 | B2 * | 7/2007 | Jomura | ..................... 280/730.2 |
| 2005/0098995 | A1 * | 5/2005 | Fischer | ..................... 280/743.2 |
| 2005/0184494 | A1 * | 8/2005 | Sakata | ..................... 280/730.2 |

FOREIGN PATENT DOCUMENTS

| JP | 11-235965 | 8/1999 |
| JP | 2002200959 A1 * | 7/2002 |
| JP | 2002-337647 | 11/2002 |
| WO | WO-03/051681 A1 | 6/2003 |
| WO | WO 2004031000 A1 * | 4/2004 |

* cited by examiner

*Primary Examiner*—Christopher Ellis
*Assistant Examiner*—Joseph Rocca
(74) *Attorney, Agent, or Firm*—Morrison & Foerster LLP

(57) ABSTRACT

A reliable hose for introduction and distribution of inflator gas improves the storing properties of an air bag device for side collision, reduces storing space, is advantageous in terms of cost, and has enough strength. A hose made of woven fabric for introduction and distribution of inflator gas is arranged in an air bag device for side collision and has one or more distributing hole(s) for introduction and distribution of gas from an inflator to the inner area of an air bag upon actuation of the air bag. On the side containing said distributing hole, there is a non-tubular portion which projects from a hose tubular portion to the outside of an opposite side to the tubular portion.

4 Claims, 3 Drawing Sheets

[Fig. 1]
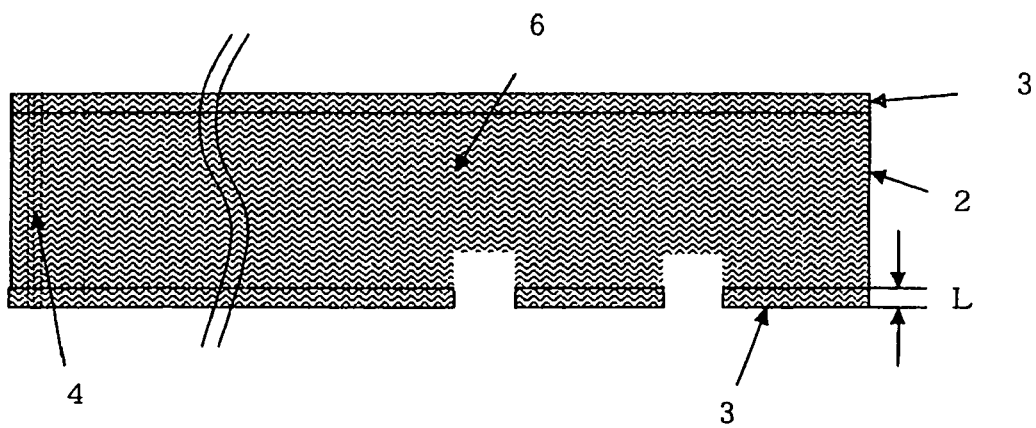
[Fig. 2]
A case where weaving is performed by needle weaving machine
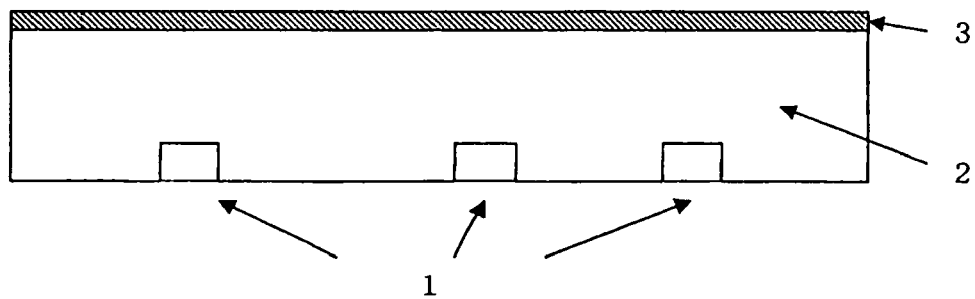
A case of sewn product
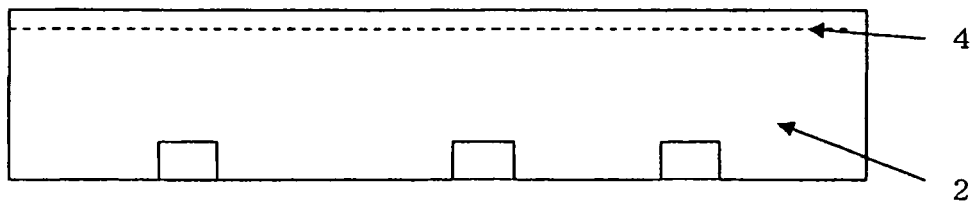

[Fig. 3]
An example of partial coating
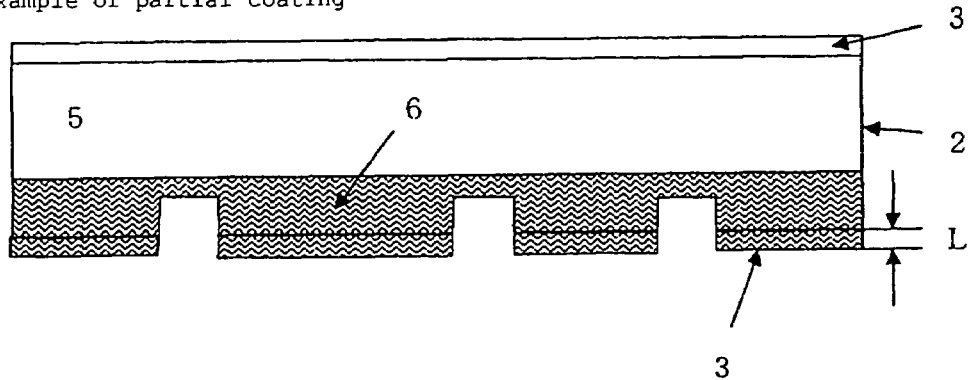
A drawing which shows opened state of the gas distributing holes
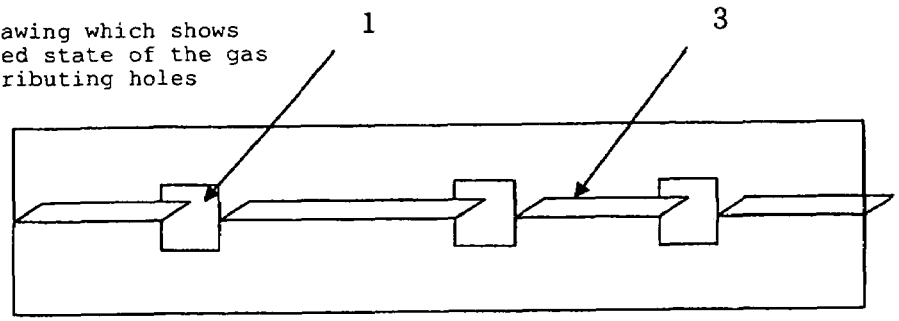
[Fig. 4]
An example of gas hole and non-tubular portion
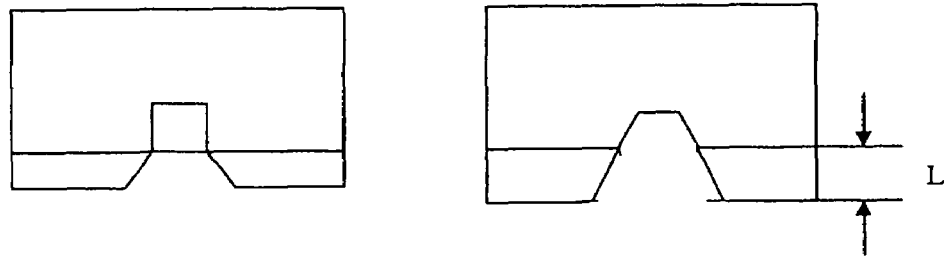

[Fig. 5]
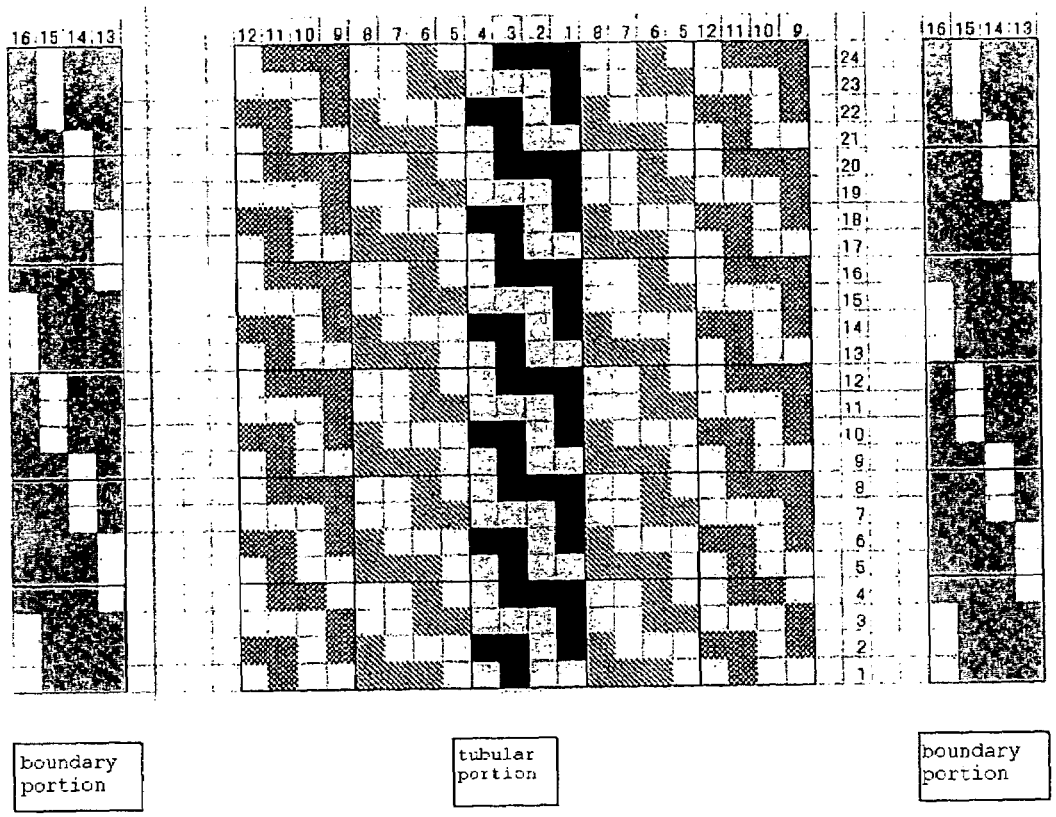
boundary portion | tubular portion | boundary portion
[Fig. 6]
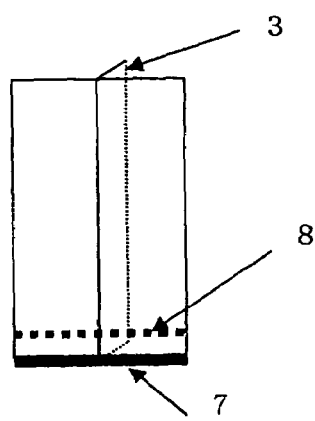

HOSE FOR INTRODUCTION AND DISTRIBUTION OF INFLATOR GAS

REFERENCE TO RELATED APPLICATIONS

This application is a national stage application under 35 USC 371 of International Application No. PCT/JP2005/008586, filed May 11, 2005, which claims priority from Japanese patent application No. 2004-143658, filed May 13, 2004, the disclosures of which are incorporated herein by reference.

TECHNICAL FIELD OF THE INVENTION

The present invention relates to the parts for an air bag device for side collision whereby persons in the car are protected upon side collision of cars and, more particularly, it relates to a hose for introduction and distribution of inflator gas which is optimum for introduction of inflator gas into the above air bag.

BACKGROUND ART

In a driver's seat, a passenger's seat, etc., air bag devices which inflate an air bag upon collision of cars to protect the persons in the car are installed. Such an air bag device is constituted from an inflator which is a gas-generating device, an air bag which is inflated by inflator gas, a hose for introduction and distribution of inflator gas which introduces gas from an inflator into an air bag (hereinafter, it will be also mentioned as a hose) and an air bag case in which the above ones are stored.

In recent years, there has been an increasing demand for an air bag device for side collision called a curtain air bag with an object of softening a shock in a side collision and mainly with an object of protection of head in addition to front collision of driver's seat and a passenger's seat. Such an air bag for side collision is stored in a center pillar or in a front pillar in a folded state and, upon collision, inflator gas is introduced into an air bag and the air bag is deployed between a door and a person in the car whereby shock to the person from the side is softened.

Since the air bag for side collision is folded and stored in a center pillar or a front pillar as mentioned above, it is important to store the air bag in a compact form occupying the space as little as possible when the interior design of the car is taken into consideration.

With regard to a hose for introduction and distribution of inflator gas, there have been proposals for an air bag device for protection of the head having a reinforcing liner tube in a gas introducing path to each inflating chamber for supplying the gas firstly to an inflating chamber of a downstream side which is far from an inflator (claims etc. of Japanese Patent Laid-Open No. 11/235,965 A) and for an air bag device for protection of the head where gas for inflation is guided to an inflating portion from an inflator and an inner tube is aligned on an inner surface of a gas flowing portion (claims etc. of Japanese Patent Laid-Open No. 2002/029,359 A).

In those proposals however, although there are descriptions that an auxiliary cloth is utilized for prevention of breakage of an air bag cushion itself by a high-pressure gas from an inflator and that flow of the gas is controlled, there is no specific consideration at all for characteristics of a hose (sometimes such a hose is called as "a liner tube" or "an inner tube"). Particularly, there is no consideration at all for a good storing property when a hose for introduction and distribution of inflator gas is stored in an air bag cushion and then folded and stored in a center pillar or a front pillar and for characteristics around the gas distributing holes of a hose being connected to an inflating portion of an air bag.

Incidentally, as mentioned hereinabove, an air bag for side collision is folded and stored in a center pillar or a front pillar and it is important to store the air bag in a compact form occupying the space as little as possible when the interior design of the car is taken into consideration. Therefore, in a hose for introduction and distribution of inflator gas, it is also an important issue to ensure a high folding property.

In addition, in an air bag for side collision, it is necessary to be deployed immediately at the collision and it is further demanded that the time until the deployment is shorter than that of an air bag for the driver's seat and for the passenger's seat. Thus, it is often to use an inflator where a gas output is relatively big and, therefore, gas pressure is apt to become very high in some portions particularly in a hose for introduction and distribution of inflator gas. Thus, there are problems that, for example, a gas distributing hole portion is deformed due to its burst by pressure of the inflator gas whereby inflated shape of an air bag upon deployment becomes non-uniform and that fiber near the gas introducing opening is cut and scattered into the air bag and melted resulting in breakage of the air bag cushion itself.

As a measure for improving the problems caused by a partial pressure increase as such, there is a method where fiber in large denier or highly strong fiber such as aramid fiber is used so that the strength of an air bag is enhanced as a whole. However, when the fiber is made thick, bulk becomes high causing a problem in a storing property and restriction in interior design of a car and that is a problem while a highly strong fiber is expensive and, when it is used, cost becomes high and that is a problem in view of practical use. Further, in passenger cars, it is often to be demanded for making its weight light in view of improvement in fuel consumption but, particularly when thicker fiber is used, an increase in weight of a hose for introduction and distribution of inflator gas is unavoidable and that disturbs the weight reduction of an air bag device and consequently of the car.

Moreover, it is usual that a hose for introduction and distribution of inflator gas is a hose made of a woven fabric, and it has been also conducted that, after a woven fabric is manufactured using a general-purpose weaving machine such as a water jet loom or a rapier loom, it is cut into an appropriate size and one side thereof is sewn by using sewing thread to give a hose-shaped product (FIG. 2). It has been also conducted to manufacture a tubular-shaped woven fabric by weaving using a cylindrical weaving machine which is used for example for the manufacture of a fire hose. When a gas distributing hole which is necessary for introduction of gas from an inflator into an air bag cushion is formed in a hose manufactured as such, a gas distribution hole is formed on a side which is opposite to the sewn side in the case of a sewn hose. In the case of hose manufactured by a cylindrical weaving machine, a gas distributing hole is able to be formed at any place because a uniform characteristic is available in a circumferential direction. They have been commonly carried out.

It has been also commonly carried out that, when a tubular-shaped woven fabric is manufactured by using a needle weaving machine for the manufacture of seat belt, a gas distributing hole is formed on the opposite side of the non-tubular portion (FIG. 2).

In a gas distributing hole formed on a tubular-shaped woven fabric manufactured by the above-mentioned method, there is a disadvantage that strength of the gas distributing hole does not become high enough and, when gas from an inflator is introduced into an inflating portion of an air bag, there are problems that the area around the gas distributing hole is broken, its shape is deformed and an inflated shape of an air bag upon deployment becomes non-uniform and that fiber near the gas introducing opening is cut, scattered into the air bag and melted resulting in a breakage of the air bag cushion itself.

On the other hand, in a woven product by a cylindrical weaving machine, the shape is cylindrical and weft is continuous. Thus, when said hose is inserted into an air bag cushion and folded into flat, the folding area is hard to make into flat due to rigidity of the weft and thickness becomes hardly small whereby there is a problem in a storing property.

SUMMARY OF THE INVENTION

The present inventors have carried out intensive investigations for the problems as such and, as a result, they propose a hose for introduction and distribution of inflator gas comprising the following constitution in order to solve the above-mentioned problems.

1. A hose made of woven fabric for introduction and distribution of inflator gas which is arranged in an air bag device for side collision and which has one or more distributing hole(s) for introduction and distribution of gas from an inflator to the inner area of an air bag upon actuation of the air bag, wherein, on the side containing said distributing hole, there is a non-tubular portion which projects from a hose tubular portion to the outside of an opposite side to the tubular portion.
2. The hose for introduction and distribution of inflator gas according to the above 1, wherein, on the side containing said distributing hole, there is a non-tubular portion which projects to the outside of the opposite side of the hose tubular portion and wherein the relation between the width (L cm) of said non-tubular portion and the area (S cm$^2$) of said adjacent distributing hole satisfies the following formula.

$$2(S^{1/2}) \geq L \geq 0.05(S^{1/2})$$

In the hose for introduction and distribution of inflator gas according to the present invention, improvement in folding property and weight reduction are attempted while durability to the flow of high pressure gas is still maintained and, in an air bag device using said hose for introduction and distribution of inflator gas, compactness and weight reduction are able to be achieved.

BRIEF DESCRIPTION OF THE DRAWINGS

FIG. 1 is an outline drawing of a sample prepared in Experimental Example 1.

FIG. 2 shows outline drawings of a woven product using a needle weaving machine and a cut/sewn product.

FIG. 3 shows an example of partial application of a coating agent and a drawing around the gas distributing holes.

FIG. 4 is an example of gas hole and non-tubular portion.

FIG. 5 shows examples of weaving pattern of a boundary portion.

FIG. 6 is a drawing of a sample for measuring the maximum resistance for pulling out at a gas distributing hole portion.

DETAILED DESCRIPTION OF THE INVENTION

The present inventors have paid their attention on a problem caused by action of a partial high pressure to the surroundings of gas distributing hole upon deployment of an air bag at the area around a gas distributing hole in a hose for introduction and distribution of inflator gas which is arranged in an air bag device for side collision and is to distribute the gas from an inflator inside the air bag upon actuation of the air bag and also on a problem of poor storing property of an air bag including said hose into a pillar and, as a result of intensive investigations, they have found that the above-mentioned problems are able to be solved when a non-tubular portion is formed on the side including said gas distributing hole and width of said non-tubular portion is set within an appropriate range to the area of the adjacent gas distributing hole whereupon the present invention has been achieved.

In the hose for introduction and distribution of inflator gas according to the present invention, a non-tubular portion which has not been constituted around a gas distributing hole in the conventional hose for introduction and distribution of inflator gas is provided and width of the non-tubular portion is set within an appropriate range to the area of the adjacent gas distributing hole whereby the problems generated around the gas distributing hole is solved.

Thus, it is now possible to suppress the breakage of the area surrounding the gas hole when gas from the inflator passes therethrough by optimizing the range of the width of non-tubular portion which is necessary corresponding to the area of a gas distributing hole. When L is more than $2(S^{1/2})$, the area occupied by the non-tubular portion becomes big in storing said hose into an air bag cushion and after the storing whereby there is a problem that storing is difficult in a storing work and, when it is folded together with an air bag cushion after storing, thickness becomes big or rigidity is resulted causing a poor storing property and that is not preferred. Further, fluttering around the gas distributing hole of the non-tubular portion becomes high upon deployment of the air bag causing a change in the flow of the gas and a deploying speed of the inflating portion becomes slow and that is not preferred in view of efficiency. It is more preferred that L is less than $(S^{1/2})$. On the other hand, when L is less than $0.05 (S^{1/2})$, strength around the gas distributing hole is hardly maintained and, upon passing of the gas, said gas distributing hole is damaged whereby a hose without reliability is apt to be formed and that is not preferred.

The above L value is preferably not less than $0.1(S^{1/2})$ and, more preferably, not less than $0.3(S^{1/2})$. Here, L is width of a non-tubular portion which is parallel to the lengthwise direction of the hose and is a distance from the end of the hose tubular portion to the end of the non-tubular portion (FIG. 3). In an example of FIG. 3, ends of the non-tubular portion are in a straight line on an extended area of the side orthogonal to the lengthwise direction of a hose of a gas distributing hole. However, in order to make the gas flow smooth when inflator gas is flown out from a gas distributing hole, the shape of the end of the non-tubular portion may be in a shape as shown in FIG. 4 and may be appropriately modified depending upon the shape of a gas hole and distance of each gas hole from an inflator. Moreover, although a non-tubular portion may be in such a state that, in the whole surface, upper cloth and lower one are interwoven by plain weave or twill weave or a part thereof may have a tubular portion, a non-tubular portion is to be in such a state that whole surface is not in a tubular shape.

When a reinforced portion is formed in an inner circumferential rim of the gas distributing hole, damage of the rim around the distributing hole by high pressure is more effectively reduced whereby that is preferred. Said reinforced portion may be formed by application of an adhesive to the rim of inner circumference of a distributing hole. When it is formed together with the formation of a distributing hole by means of a laser cutting, manufacturing steps for the hose are able to be simplified whereby that is preferred.

In addition, the case where the reinforced portion of the rim around the circumference of the gas distributing hole is formed by a direct contact of a heated material to the rim of the circumference of the distributing hole is a preferred embodiment of the present invention.

Moreover, in achieving the good folding property and weight reduction of a hose for introduction and distribution of inflator gas, it is preferred to make the surficial unevenness of the woven fabric constituting the hose small so as to suppress the accumulation of a coating agent on a concave area and to make thickness of the coat thin and uniform whereby its action is utilized to the maximum extent and, at the same time, to suppress the generation of thickness spots whereby its softness and flexibility are ensured. In the hose of the present invention, it is preferred that a cover factor (CF) value determined from the following formula showing the tightness of the weaving density of a hose woven fabric is 850 to 2,000 in both warp direction [CF(warp)] and weft direction [CF(weft)]. As a result thereof, reduction in surficial unevenness of a hose substrate cloth is also able to be achieved.

$CF(\text{warp}) = [\text{Fineness of warp}(\text{dtex})]^{1/2} \times \text{Weaving density of warp}(\text{numbers of warp}/2.54 \text{ cm})$ $CF(\text{weft}) = [\text{Fineness of weft}(\text{dtex})]^{1/2} \times \text{Weaving density of weft}(\text{numbers of weft}/2.54 \text{ cm})$ From a viewpoint to make the weaving density of the hose of the present invention tight, it is preferred to constitute said hose with finer yarn. To be more specific, total fineness of the yarn (both warp and weft) constituting the hose is 110 dtex to 1,400 dtex. Although the yarn may be a twist yarn or a processed yarn or may be a monofilament, a filament yarn is used preferably because it is preferred that the filament constituting the yarn is fine so as to make the unevenness on the woven fabric surface after weaving small. In the case of a filament yarn, its cross-sectional shape is round cross section, flat cross section, triangular cross section, etc. and there is no limitation therefor. When a twist yarn or a processed yarn is used, fineness after twisting or after processing is called a total fineness of the yarn. More preferably, it is 167 dtex to 700 dtex for both warp and weft. Still more preferably, it is 235 dtex to 585 dtex for both warp and weft. When the warp is less than 110 dtex, strength in the lengthwise direction of the hose is insufficient and, in addition, large amount of yarn is needed for raising the weaving density of the resulting woven fabric. Since time is necessary for the preparation therefor, that is not preferred in view of economy. When the weft is less than 110 dtex, many wefts are to be picked in order to raise the weaving density upon weaving whereby a weaving productivity lowers and that is not preferred in economy. When total fineness of the yarn constituting the hose is more than 1,400 dtex, the hose itself becomes bulky whereupon the workability in storing into the air bag cushion becomes poor or, after storing, a storing property when an air bag is folded and stored into a pillar becomes poor and that is not preferred.

Single yarn fineness of a yarn constituting the hose is preferred to be not more than 10 dtex. Particularly, in such a view that an air bag cushion including a hose is made soft in a folding direction in storing, the single yarn fineness of a weft (yarn to be used in the circumferential direction of a hose) is more preferably not more than 8 dtex, still more preferably not more than 4 dtex and, particularly preferably, not more than 3 dtex. Lower limit of the single yarn fineness is preferred to be 1 dtex.

Although there is no particular limitation for the type of the fiber constituting the yarn which constitutes the hose, it is possible to use, for example, polyamide fiber or polyester fiber. Tenacity of the yarn constituted by such a fiber is preferably not less than 5 cN/dtex, more preferably not less than 6 cN/dtex and, still more preferably, not less than 7 cN/dtex in terms of tenacity of raveled yarn. Tenacity of raveled yarn means the tenacity of the yarn which is obtained by unweaving warp and weft which constitute the hose and by removing rubber and resin adhered to the yarn.

Incidentally, not only for the above-mentioned tenacity of raveled yarn but also for the above-mentioned total fineness and single fineness, the values thereof are those measured by using the yarn raveled from the hose. In order to prepare a hose constituted from yarn having the total fineness, single yarn fineness and tenacity of raveled yarn as such, yarn in which the total fineness, single yarn fineness and tenacity are within the same range as the raveled yarn may be used as a material yarn.

Although the weaving pattern of the hose of the present invention is not particularly limited, plain weave, twill weave or satin weave are preferred when good strength, little surficial unevenness and little slippage are taken into consideration. For example, in the area corresponding to the position to be folded (position to be bent) in storing in the hose, weaving pattern having less crossing of warp and weft such as twill weave and satin weave may be used while, in other area, plain weave may be used. Further, in the present invention, although the weaving pattern at the boundary between tubular portion and non-tubular portion may be, for example, plain weave or 2/2 Basket weave and is not particularly limited, the weaving pattern shown by FIG. 5 may be effective if energy absorbing effect and little slippage when gas from an inflator is introduced into a hose and the hose is suddenly deployed are taken into consideration.

Cover factors (CF) of the tubular portion which are commonly used as indexes for weaving density of the woven fabric prepared at that time are preferred that both CF (warp) and CF (weft) are not less than 850. More preferably, they are not less than 1,000 and, still more preferably, they are not less than 1,100. When the CF of a hose woven fabric is made not less than the above-mentioned lower limit, it is now possible to give a hose having excellent strength and gas blocking property.

When the CF of a hose woven fabric is too small, there are some cases where strength and gas blocking property tend to lower and, further, when coating is conducted using a coating agent, the coating agent is apt to come into the gap between yarns, applying amount of the coating agent increases and weight reduction and improvement in folding property are hard to be achieved. Moreover, when inflator gas passes through a gas distributing hole, raveling is apt to be generated around the distributing hole. On the other hand, when weight reduction of a hose is taken into consideration, it is desirable to make the CF of a hose not more than 2,000.

With regard to a weaving machine used for weaving of the distributing hose according to the present invention, it is advantageous and preferred in terms of weaving cost to use a method using a broad-width general-purpose weaving machine such as a water jet loom equipped with dobby, a Rapier loom equipped with dobby and an air jet loom equipped with jacquard whereby tubular-shaped fabrics having non-tubular portions are produced in plural rows on a weaving machine at the same time. It is however also possible to use a needle weaving machine which is able to produce tubular-shaped fabric having a non-tubular portion on one side.

Inner diameter of the distributing hose according to the present invention woven by the use of the above-mentioned fiber and weaving machine is preferably 2 cm to 6 cm. When inner diameter of the hose is less than 2 cm, pressure loss in the hose becomes big and partial breakage is apt to happen. On the other hand, when inner diameter of the hose is more than 6 cm, it is difficult to store the hose in an air bag device and that is not preferred. More preferably, inner diameter of the hose is 3 cm to 5 cm.

In the hose after weaving, coating treatment using a coating agent is carried out if necessary with an object of enhancing the hose strength and gas blocking property and of enhancing the durability of the gas distributing hole. It is preferred that the coating amount is made from 0% by weight (non coating) to less than 80% by weight to the weight of the hose before coating. As mentioned already however, a coating agent is a cause of deterioration of softness and flexibility of a hose and, therefore, it is more preferred that the coating amount of a coating agent is made less than 50% by weight with an object of reducing the coating amount so as to ensure softness and flexibility of a hose and to improve the folding property. More preferably, it is less than 25% by weight. However, when it is desirable to reinforce the surrounding area of the gas distributing hole with a coating agent, it is desirable that amount of the coating agent used is not less than 5% by weight to the weight of the hose before coating in view of a sufficient ensuring of the effect. Here, all of the amounts of the coating agent are the amounts after drying.

With regard to a method for achieving the above-mentioned coating amount, it is effective that the unevenness of the woven fabric surface is made as little as possible and application is conducted uniformly with thin coated thickness. For such a purpose, it is effective that an area of a coating blade contacting to the woven fabric is made very small whereby a coating is done as if the coating blade scrapes off the coating agent along the unevenness of the woven fabric and that, in adhesion of rubber, very thin rubber is prepared and adhered to the woven fabric.

When coating is carried out along woven fabric surface by the above-mentioned coating blade, it is preferred that bow of woven fabric in the direction orthogonal to the coating direction (usually, in the direction of weft of the woven fabric) is small. That is because, in case a coating blade moves along the woven fabric surface when the bow is big, the coating blade does not become parallel to the weft, uniform scraping-off of the coating agent is not able to be well conducted and thin coating is not possible. With regard to the specific degree of the bow, a bow in the width direction (weft direction) of a hose measured in accordance with the stipulation of JIS L 1096 8.11 is preferably not more than 20%, more preferably not more than 15% and, still more preferably, not more than 10%. The bow is measured in such a manner that, when a line is drawn crossing another end from the end of a width direction of a hose so that it crosses the lengthwise direction of a hose in case a hose is folded in flat, length of this line is measured as the "a" mm as stipulated by the above JIS method. In order to reduce the above bow, it is recommended to prevent the bending of the hose woven fabric itself during the steps after the weaving until the hose woven fabric sent out from the weaving machine is wound up. Thus, in sending the hose woven fabric after weaving using a roll or the like and subjecting to the next step, etc., it is desirable that the forwarding roll, etc. are arranged in such a manner that the hose woven fabric is bent as little as possible. It is also effective that CF of the hose woven fabric is designed so as to make within the above range so that the woven fabric is made tight whereby slippage of the yarn constituting the hose is suppressed.

It is also effective that a coating agent is applied in a selectively concentrated manner only in the vicinity of the gas distributing hole of hose so that the total applying amount is reduced. For example, it is possible that the part from the surrounding of the gas distributing hole to the area which is about 10 mm inside toward the hose body is thickly coated while other hose body is thinly coated (FIG. 3). In that case, difference between the applying amount in the thinly coated portion and the thickly coated portion is preferably 1.5- to 10-fold and, more preferably, 2- to 5-fold. The thinly coated portion may be uncoated.

Examples of the rubber or the synthetic resin which is able to be used as the above coating agent are neoprene rubber, ethylene propylene diene rubber, silicone rubber, polyester resin, polyamide resin, polyester elastomer, polyamide elastomer and polyurethane elastomer. Among them, silicone rubber having an excellent heat resistance is preferred and the most preferred specific examples are thermosetting addition polymerized silicone rubber and two-liquid type RTV (room-temperature vulcanization) silicone rubber.

It is also effective to add an amino-type silane coupling agent, an epoxy-modified silane coupling agent, a vinyl-type silane coupling agent, a chlorine-type silane coupling agent or the like to the silicone rubber so as to enhance the adhesive property.

Now, in order to enhance the storing property which is a characteristic feature of the present invention, it is also effective to enhance the softness and flexibility of the silicone itself. To be more specific, when a silicone rubber of a low modulus type where stress upon stretching to a predetermined extent is low is used, it is now possible to suppress the increase in rigidity of hose due to rigidity of silicone as much as possible and to suppress the repulsive property of silicone itself upon folding and rounding of a hose.

There is no limitation for a method of applying the above coating agent to a hose and it is possible to adopt any applying method such as a method where the woven hose is directly dipped in a coating agent and a method where application is carried out on the hose surface using a brush or the like.

In order to satisfy the weight reduction, weight of a hose is preferably not more than 2,000 g/m$^2$, more preferably not more than 1,500 g/m$^2$ and, still more preferably, not more than 1,000 g/m$^2$. The unit area (m$^2$) used here is an area when a hose is crushed into a flat shape and weight includes that of a coat. When bulkiness after storing is taken into consideration, thickness of a hose after coating (hose woven fabric in the case of non-coating) is preferably not more than 2.0 mm, more preferably not more than 1.5 mm and, still more preferably, not more than 1.0 mm. When any sewn portion exists, measurement is done excluding such a portion.

A gas distributing hole of a hose for introduction and distribution of inflator gas in accordance with the present invention is able to effectively suppress the damage around the gas distributing hole upon passage of gas when a maximum pull-out resistance around said distributing hole is enhanced to an extent of not lower than 70 N/3 cm. More preferably, it is not lower than 100 N/3 cm and, still more preferably, it is not more than 160 N/3 cm.

Here, the term maximum pull-out resistance is a value showing the strength of woven fabric determined by a test method for woven fabric stipulated in JIS L 1096 8.21.3 (pin hanging method). To be more specific, woven fabric constituting a hose is cut into a sample of 3 cm width and 5 cm length where a gas distributing hole portion is at an end and where a sample width direction orthogonally crosses the warp or weft direction whereupon weft or warp sample is respectively prepared, then a pin is inserted into a position which is 3 mm from the end (gas distributing hole portion) of the resulting sample and said sample is attached to a woven fabric tensile tester and the maximum value obtained by pulling at a pulling speed of 15 cm/min is defined as the maximum pull-out resistance.

Even when the side constituting the gas distributing hole does not cross warp or weft or even when it is circular, it is also possible that, similarly, a sample of the above size is cut out in such a manner that the gas distributing hole portion is at an end of a sample and, using the most projected part of said distributing hole portion as a standard, the weft direction or the warp direction of the sample is made orthogonal to the weft direction or the warp direction of the hose substrate cloth, respectively, then a pin is inserted into a position which is 3 mm from the distributing hole portion and a tensile test is carried out. When a side of a gas distributing hole is less than 3 cm, a sample is prepared by the above method using the actual distributing hole size as a standard, the same measurement is carried out and the resulting numeral is converted into a value per 3 cm. When a maximum pull-out resistance of a gas distributing hole having, for example, a non-tubular portion is measured, a form containing a non-tubular portion is available in a weft sample and the width 3 cm in that case is measured in such a manner that the non-tubular portion is not contained (FIG. 6).

In case the maximum pull-out resistance measured as above is less than 70 N/3 cm and when high-pressure gas ejected from an inflator is sent to an inflating portion of an air bag and passes the distributing hole portion in an instant, a part of warp and/or weft of the distributing hole portion are/is raveled whereupon shape of the distributing hole is deformed and the gas distributing hole becomes larger than the designed size. When the gas distributing hole is deformed and enlarged as such, discharged amount of gas from this gas distributing hole becomes more than the designed value and an inflating form of the air bag doe not become uniform. Especially in the case of an air bag having plural inflating portions, excessive gas is introduced into an air bag inflating portion for a specific part and there is a risk of burst and there are some cases where a collision-relieving function upon collision is significantly deteriorated. In addition, when the end of the distributing hole is raveled and scattered in an air bag and melted, there is also a risk of burst of an air bag by that. Maximum pull-out resistance is more preferably not less than 100 N/3 cm and, still more preferably, not less than 160 N/3 cm.

Formation of a gas distributing hole may be conducted after weaving of a hose woven fabric and, in conducting the coating using the above-mentioned coating agent, it is also possible to form a gas distributing hole after coating. Numbers of the distributing hole are not particularly limited and may be appropriately decided by taking the size of air bag, inflating form, etc. into consideration. Size of the distributing hole is preferably from 0.25 $cm^2$ to 16 $cm^2$ and, more preferably, from 1 $cm^2$ to 9 $cm^2$. When the size of the distributing hole is larger than 16 $cm^2$, flow rate of the inflator gas from said distributing hole becomes large, heating takes place locally, breakage proceeds from such a portion, inflating form of an air bag becomes non-uniform and there is a risk of causing a breakage of an air bag cushion. On the other hand, when it is smaller than 0.25 $cm^2$, many distributing holes are to be formed for deploying the air bag in an instant causing labor for the processing and cost whereby that is not preferred. Although there is no particular limitation for the shape of the distributing hole, it is selected from, for example, square, rectangle, triangle, a shape having curve, etc.

With regard to the above-mentioned gas distributing hole, it is preferred that, in addition to optimization of its numbers and arrangement position, the sizes near the inflator and apart therefrom are appropriately adjusted so that an air bag cushion is able to be uniformly inflated. That is because, when doing as such, an inflating form of an air bag upon deployment is able to be controlled.

In the above-mentioned gas distributing hole, when high-pressure and high-temperature gas is ejected, fiber around said distributing hole may be raveled whereby the gas distributing hole itself may be enlarged or the raveled fiber may cause poor deployment or burst of an air bag. In order to prevent such an unfavorable outcome, a reinforced portion may be formed around the gas distributing hole. Said reinforce portion may be formed by (1) a method where, when a distributing hole is formed by means of laser cutting, fiber around the distributing hole is melted and welded at the same time, (2) a method where a heated material is directly contacted to the cross section of a previously formed gas distributing hole so that the fiber around there is adhered and (3) a method where an adhesive is used and the fiber of said portion is adhered.

When the reinforced portion is formed using an adhesive, it is also possible in addition to a method where an adhesive is directly applied to a perforated cross section of a gas distributing hole that an adhesive is impregnated in and adhered to a part which is within 1 cm from the perforated line for the gas distributing hole of the outer and/or inner surface(s) of a hose followed by solidifying. By doing so, strength of the reinforced portion is able to be further enhanced. Although there is no particular limitation for the adhesive used at that time, that which solidifies within a short time such as an instantaneous adhesive is preferred and, to be more specific, an adhesive of a cyanoacrylate type which is able to achieve the adhesion within a short time and has an excellent heat resistance (such as 3000 DX series manufactured by Cemedine) may be exemplified.

In order to further enhance the strength of the reinforced portion formed as above, it is also possible that the heated material is contacted to the perforated end of the gas distributing hole and pushed into front side and lateral side to an extent of about 1 mm so that the welding is ensured.

In addition, the area around the gas distributing hole is apt to be particularly affected by force when high-pressure inflator gas passes whereby the surrounding yarn is apt to be raveled and, as the weaving pattern around the gas distributing hole, a plain weave where warp and weft are crossed and pressed each other whereby yarn is hardly pulled out is preferably used in order to prevent such a raveling. On the other hand, in a place at the position of a hose body which is folded upon storing, although it is effective that this place uses weaving pattern having little crossing points in warp and weft yarns such as satin weave and twill weave, it is also possible that the whole hose body is constituted by plain weave. In order to achieve a preventive effect for raveling, it is preferred that the part which is 3 mm or more from rim of each gas distributing hole toward the hose body is in plain weave. More preferably, the part of 5 mm or more is in plain weave. However, it is important that a plain weave portion is constituted within such an extent that the storing property of a hose itself is not deteriorated. Thus, it is possible to achieve the present invention even when no plain weave is used at all and a plain weave is not necessary at all times.

Total fineness of the yarns constituting the above-mentioned air bag cushion for side collision is preferably from 200 dtex to 600 dtex. When the total fineness is more than 600 dtex, there is a problem in terms of storing property while, when it is less than 200 dtex, strength of substrate cloth is insufficient even when distribution of inflator gas is controlled whereby there is a high risk of burst and that is not preferred. More preferably, it is from 300 dtex to 500 dtex.

Single yarn fineness of a multifilament constituting an air bag cushion for side collision is preferably from 2 dtex to 10 dtex and, more preferably, from 3 dtex to 6 dtex. When the single yarn fineness is more than 10 dtex, rigidity of the substrate cloth becomes high and a storing property lowers while, when it is less than 2 dtex, filament (single yarn) break happens upon weaving and defect of substrate cloth becomes much whereby that is not preferred.

There is no limitation for the method of manufacturing the above-mentioned air bag cushion but it may be manufactured by known weaving methods. The hose for introduction and distribution of inflator gas prepared as above was installed in an air bag cushion and connected to an inflator. Incidentally, although the air bag cushion and the hose for introduction and distribution of inflator gas may be unified by means of sewing or adhesion at the hose rim with the air bag cushion, the above hose is fixed with the inflator and, therefore, there is no particular need for unification.

The air bag for side collision prepared as such is folded and stored in a center pillar, a front pillar, etc. in the car.

EXAMPLES

Now the present invention will be illustrated in more detail by referring to Examples. Measurements in Examples are according to the following measuring methods.

Thickness: according to JIS L 1096 8.5.1

Weight: according to JIS L 1096 8.4.1

Test on easiness of bending:

A hose (product where its length was cut into 40 cm) prepared in each Experimental Example was fully inserted into a tube-shaped Nylon 66 woven fabric (yarn of 350 dtex/108 f was used; warp weaving density: 59 yarns/2.54 cm; weft weaving density: 59 yarns/2.54 cm) in 40 cm length where total width in a folded state was 5 to 10 mm longer than a hose prepared in Experimental Example and bent one time at center in a direction which intersected with right angle to the lengthwise direction of a hose (weft direction). After that, it was bent once again at center and the bending property at that time was confirmed.

A: able to be easily bent both times

B: able to be bent both times if conducted forcibly

C: unable to be bent

Evaluation of raveling of distributing hole (test on raveling of gas distributing hole after introduction of pressurized gas into a hose):

One end of a hose (length: 2 m) prepared in each Experimental Example (provided with distributing hole) was closed by sewing, pressurized nitrogen gas (initial pressure: 400 kPa; volume: 5 liters) was introduced from another end (open end) and the state of the distributing hole after that was observed. With regard to the evaluation, degree of raveling of the rim of the distributing hole which was nearest the nitrogen gas introducing inlet was evaluated according to the following grades.

A: deformation was hardly noted

B: deformation was noted quite little

C: deformation was noted a little

D: deformation was considerably noted

E: deformation was very significantly noted

Experimental Example 1

A jacket (tube-shaped woven fabric before coating) was woven by a hollow weaving using a water-jet weaving machine equipped with dobby. The filament used was polyamide 66 fiber with a tenacity of 8.1 cN/dtex where warp was 470 dtex/72 f and weft was 470 dtex/72 f in which single yarn of both had around cross section. After that, the product was subjected to a washing step at 95° C. and to a drying/setting step at 180° C. to give a woven fabric where 16 rows of tubular-shaped woven products were aligned in parallel in a warp direction so as to make tubular portion width 68 mm, interval with the adjacent tubular portion (hereinafter, referred to as non-tubular portion) 30 mm and total width 160 cm. Weaving density and CF of the tubular portion are shown in Table 1.

Both sides of the resulting broad-width multi-row-woven fabric were applied with a coating agent (silicone resin: "Elastosil LR 6200" manufactured by Wacker) containing an additive ("Adhesion Promoter HF86" manufactured by Wacker) in an applying amount of 44 g/m$^2$ for one side followed by curing at 170° C. for 2 minutes. After that, the woven fabric was subjected to a heat cutting at the part which is 15 mm from the boundary of the tubular portion in parallel to the warp with the full length of 2 m to prepare a hose. Full width and length of the resulting hose when folded in flat were 98 mm and 2 m, respectively. One end of the hose was closed by lockstitch (three-row sewing) of 2.5 mm pitch using resin-processed Nylon 66 yarn (1,400 dtex) and five gas distributing holes in a square shape where one side was 3 cm were perforated every 30 cm from an open end of the hose (FIG. 1). Hot flat iron was directly contacted to cross sections of warp and weft of the perforated portions and fibers around said distributing holes were heated to melt/weld at 500° C. for 8 seconds whereupon a hose for introduction and distribution of inflator gas having reinforced areas around the gas distributing holes was prepared. Each side of the distributing holes was formed in such a manner that it crossed at right angle to warp or weft of the jacket. Result of evaluation of this hose for introduction and distribution of inflator gas is shown in Table 1.

Experimental Example 2

The same operation as in Experimental Example 1 was carried out to give a woven fabric except the use of polyamide 66 fiber with a tenacity of 8.0 cN/dtex where warp was 470 dtex/72 f and weft was 470 dtex/72 f in which single yarn of both had a nearly elliptic cross-section and degree of flatness (long diameter/short diameter) was 3.0. The result is shown in Table 1.

Experimental Example 3

A jacket (tube-shaped woven fabric before coating) was woven by a hollow weaving using a Rapier weaving machine equipped with dobby. The filament used was polyamide 66 fiber with a tenacity of 8.1 cN/dtex where warp was 470 dtex/144 f and weft was 470 dtex/144 f in which single yarn of both had a round cross section. After that, the product was subjected to a washing step at 95° C. and to a drying/setting step at 180° C. to give a woven fabric where 16 rows of tubular-shaped woven products were aligned in parallel in a warp direction so as to make tubular portion width 68 mm, interval with the adjacent tubular portion (hereinafter, referred to as non-tubular portion) 30 mm and total width 160 cm. Weaving density and CF of the tubular portion are shown in Table 1.

The resulting broad-width multi-row-woven fabric was subjected to a heat cutting at the part which is 15 mm from the boundary of the tubular portion in parallel to the warp with the full length of 2 m to prepare a hose. Full width and length of the resulting hose when folded in flat were 98 mm and 2 m, respectively. One end of the hose was closed in the same way as in Experimental Example 1 while five gas distributing holes in a square shape where one side was 2 cm were perforated every 30 cm from an open end of the hose. Hot flat iron was directly contacted to cross sections of warp and weft of the perforated portions and fibers around said distributing holes were heated to melt/weld at 500° C. for 8 seconds whereupon a hose for introduction and distribution of inflator gas having reinforced areas around the gas distributing holes was prepared. Each side of the distributing holes was formed in such a manner that it crossed at right angle to warp or weft of the jacket. Result of evaluation of this hose for introduction and distribution of inflator gas is shown in Table 1.

Experimental Example 4

A jacket (tube-shaped woven fabric before coating) was woven by a hollow weaving using a water-jet weaving machine equipped with dobby. The filament used was polyamide 66 fiber with a tenacity of 8.1 cN/dtex where warp was 470 dtex/72 f and weft was 470 dtex/72 f in which single yarn of both had a round cross section. After that, the product was subjected to a washing step at 95° C. and to a drying/setting step at 180° C. to give a woven fabric where 16 rows of tubular-shaped woven products were aligned in parallel in a warp direction so as to make tubular portion width 68 mm, interval with the adjacent tubular portion (hereinafter, referred to as non-tubular portion) 6 mm and total width 119 cm. Weaving density and CF of the tubular portion are shown in Table 1.

Both sides of the resulting broad-width multi-row-woven fabric were applied with a coating agent having the same additive as in Experimental Example 1 in an applying amount of 44 g/m$^2$ for one side in the same way as in Experimental Example 1 followed by curing under the same condition as in Experimental Example 1. After that, the woven fabric was subjected to a heat cutting at the part which is 3 mm from the boundary of the tubular portion in parallel to the warp with the full length of 2 m to prepare a hose. Full width and length of the resulting hose when folded in flat were 74 mm and 2 m, respectively. One end of the hose was closed in the same way as in Experimental Example 1 while five gas distributing holes in a square shape where one side was 3 cm were perforated every 30 cm from an open end of the hose. Hot flat iron was directly contacted to cross sections of warp and weft of the perforated portions and fibers around said distributing holes were heated to melt/weld at 500° C. for 8 seconds whereupon a hose for introduction and distribution of inflator gas having reinforced areas around the gas distributing holes was prepared. Each side of the distributing holes was formed in such a manner that it crossed at right angle to warp or weft of the jacket. Result of evaluation of this hose for introduction and distribution of inflator gas is shown in Table 1.

Experimental Example 5

Using polyamide 66 filament fiber with a tenacity of 8.1 cN/dtex, where single yarn had a round cross section and where warp yarn was 470 dtex/72 f and weft yarn was 235 dtex/36 f//2 ply in a hose state, a jacket whose weaving pattern was plain weave was woven by needle weaving machine with the total width 72 mm where a non-tubular portion of 4 mm width on its edge was located. Weaving density and CF of the resulting jacket are shown in Table 1.

The resulting jacket was folded in flat, dipped in a coating agent having the same additive as in Experimental Example 1, taken out, subjected to a uniform both-side coating by removal of an excessive coating agent using a squeezing plate so as to make the applied amount uniform and cured at 170° C. for 2 minutes. Applied amount of the coating agent at that time was 6.3 g/m (width).

One end of the hose was closed in the same way as in Experimental Example 1 while five gas distributing holes were perforated in square of 3 cm side on the area having no non-tubular portion. Then, a hot flat iron was contacted in such a manner that clearance to cross section of warp and weft of the perforation was made zero and welding was performed by the hot flat iron at 500° C. for 8 seconds. A hose for introduction and distribution of inflator gas was prepared from the resulting hose. Result of evaluation of the hose for introduction of inflator gas is shown in Table 1.

Experimental Example 6

Using polyamide 66 filament fiber with a tenacity of 8.1 cN/dtex, where single yarn had a round cross section and where warp yarn was 470 dtex/72 f//5 ply and weft yarn was 470 dtex/72 f//10 ply in a hose state, a jacket whose weaving pattern was plain weave was woven by needle weaving machine with the total width 75 mm where a non-tubular portion of 4 mm width on its edge was located. Weaving density and CF of the resulting jacket are shown in Table 1.

The resulting jacket was folded in flat, dipped in a coating agent having the same additive as Experimental Example 1 and taken out, subjected to a uniform coating on both sides by removing an excessive coating agent by a squeezing plate so that the applied amount became uniform and cured at 170° C. for 2 minutes. Applied amount of the coating agent at that time was 42 g/m (width).

One end of the hose was closed in the same way as in Experimental Example 1 while five gas distributing holes were perforated in square of 3 cm side on the area having no non-tubular portion. Then, a hot flat iron was contacted in such a manner that clearance to cross section of warp and weft of the perforation was made zero and welding was performed by the hot flat iron at 500° C. for 8 seconds. A hose for introduction and distribution of inflator gas was prepared from the resulting hose. Result of evaluation of the hose for introduction of inflator gas is shown in Table 1.

Experimental Example 7

Woven fabric of plain weave was woven using a water-jet weaving machine. The filament used was polyamide 66 fiber with a tenacity of 8.1 cN/dtex where warp was 470 dtex/72 f and weft was 470 dtex/72 f in which single yarn of both had a round cross section. After that, the product was subjected to a washing step at 95° C. and to a drying/setting step at 180° C. to give a woven fabric of plain weave with total width of 160 cm.

One side thereof was applied with a coating agent having the same additive as in Experimental Example 1 in the same manner as in Experimental Example 1 so as to make the applied amount 45 g/m$^2$ and then cured under the same condition as in Experimental Example 1. After that, it was subjected to a heat cutting in parallel to the warp to give a coated fabric having 156 mm width and 2 m total length. The resulting coated fabric was folded so as to make the coated portion inside at the center of the width direction and parallel to warp, and sewn at the area which was 1 cm from the end throughout the full length using a sewing yarn used in Experimental Example 1 to prepare a tube-shaped woven fabric. Total width and the length when the resulting hose was folded in flat were 78 mm and 2 m, respectively. After that, one end of the hose was closed in the same way as in Experimental Example 1, five gas distributing holes in a square shape where one side was 3 cm were perforated every 30 cm from an open end of the hose. Hot flat iron was directly contacted to cross sections of warp and weft of the perforated portions and fibers around said distributing holes were heated to melt/weld at 500° C. for 8 seconds whereupon a hose for introduction and distribution of inflator gas having reinforced areas around the gas distributing holes was prepared. Each side of the distributing holes was formed in such a manner that it crossed at right angle to warp and weft. Result of evaluation of this hose for introduction and distribution of inflator gas is shown in Table 1.

It will be noted from Table 1 that, in the hoses for introduction of inflator gas according to Experimental Examples 1, 2 and 3, folding property was good, reinforcement around the distributing hole was achieved and durability when pressurized gas was flown in was good and that any of them was a highly reliable hose.

In the hose for introduction of inflator gas according to Experimental Example 4, although the folding property was good, strength around the distributing hole was difficult to be maintained to the pressure of gas and, when pressurized gas was flown in, deformation of the shape around the gas hole was somewhat noted.

In the hose for distribution of inflator gas according to Experimental Example 5, although the storing property was good, breakage around the distributing hole was noted when pressurized gas was flown in and there was a problem in its reliability. In the hose for distribution of inflator gas accord-

TABLE 1

|  | Unit | Expt. Ex. 1 | Expt. Ex. 2 | Expt. Ex. 3 | Expt. Ex. 4 | Expt. Ex. 5 | Expt. Ex. 6 | Expt. Ex. 7 |
|---|---|---|---|---|---|---|---|---|
| Material |  | polyamide 66 | polyamide 66 | polyamide 66 | polyamide 66 | polyamide 66 | polyamide 66 | polyamide 66 |
| Warp | dtex | 470 | 470 | 470 | 470 | 470 | 2350 | 470 |
| Weft | dtex | 470 | 470 | 470 | 470 | 470 | 4700 | 470 |
| Single yarn cross section |  | round | flat | round | round | round | round | round |
| Weaving density (tubular portion) |  |  |  |  |  |  |  |  |
| Warp direction (lengthwise) | yarns/2.54 cm | 54 | 54 | 56 | 54 | 54 | 74 | 46 |
| Weft direction | yarns/2.54 cm | 54 | 54 | 59 | 54 | 54 | 10.5 | 46 |
| Weight of jacket | g/m (width) | 42 | 42 | 45 | 32 | 31 | 140 | 26.5 |
| Applied amount of silicone | g/m (width) | 8.6 | 8.6 | 0 | 6.5 | 6.3 | 42 | 7.0 |
| Applied rate of silicone (to weight of jacket) | wt % | 20.5 | 20.5 | 0 | 20.3 | 20.3 | 30.0 | 26.4 |
| Coated side |  | outer side of hose | outer side of hose | none | outer side of hose | outer side of hose | outer side of hose | inner side of hose |
| Welding on the rim of gas hole |  | present | present | present | present | present | present | present |
| Thickness | mm | 0.7 | 0.6 | 0.8 | 0.7 | 0.7 | 3.1 | 0.7 |
| Weight | g/m$^2$ | 516 | 510 | 459 | 520 | 515 | 2440 | 430 |
| CF (length/breadth) |  | 1171/1171 | 1171/1171 | 1214/1279 | 1171/1171 | 1171/1171 | 3587/720 | 997/997 |
| Area of gas hole (S) | cm$^2$ | 9.0 | 9.0 | 4.0 | 9.0 | 9.0 | 9.0 | 9.0 |
| Width of non-tubular portion (L) | cm | 1.5 | 1.5 | 1.5 | 0.3 | 0 | 0 | 0 |
| Strength for hanging on a pin |  |  |  |  |  |  |  |  |
| Warp direction (pulling-out of warp) | N/3 cm | 280 | 290 | 240 | 275 | 201 | 250 | 190 |
| Weft direction (pulling-out of weft) | N/3 cm | 255 | 265 | 220 | 180 | 198 | 655 | 195 |
| Storing property (easiness of bending) | A to C | A | A | A | A | A | C | A |
| Evaluation of raveling of distributing hole | A to E | A | A | B | C | D | B | D |

Storing property (easiness of bending)
A: able to be easily bent for twice
B: able to be bent if conducted forcibly
C: unable to be bent easily
Evaluation of B and higher is defined as "to stand the test".
Evaluation for raveling of distributing hole
A: deformation was hardly noted
B: deformation was noted quite little
C: deformation was noted a little
D: deformation was considerably noted
E: deformation was very significantly noted
Evaluation of C and higher is defined as "to stand the test".

ing to Experimental Example 6, although reinforcement around the distributing hole was achieved and durability when pressurized gas was flown in was good, there was a problem that rigidity was high and storing property was poor. In the hose for distribution of inflator gas according to Experimental Example 7, although the storing property was good, strength around the distributing hole was insufficient and, when pressurized gas was flown in, breakage around the gas hole was noted and there was a problem in reliability.

The hose for introduction and distribution of inflator gas according to the present invention has an excellent storing property and is also able to surely distribute the inflator gas into the deployed portion of the air bag efficiently. In addition, it is able to be manufactured by a highly economical method and is able to contribute in diffusion of air bags in an automobile industry.

The invention claimed is:

1. A hose made of woven fabric for introduction and distribution of inflator gas which is arranged in an air bag device for side collision and which has one or more distributing holes for introduction and distribution of gas from an inflator to the inner area of an air bag upon actuation of the air bag, wherein, on the side containing said distributing hole, there is a non-tubular portion which projects from a hose tubular portion to the outside;

wherein the relation between the width (L cm) of said non-tubular portion and the area (S cm$^2$) of said adjacent distributing hole satisfies the following formula:

$$2(S^{1/2}) \geq L \geq 0.05(S^{1/2}); \text{ and}$$

wherein a cover factor of the woven fabric is 850 to 2,000 in both a warp direction and a weft direction;

wherein the cover factor of the woven fabric in the warp direction satisfies the following formula:

[Fineness of warp (dtex)$^{1/2}$]×Weaving density of warp (numbers of warp/2.54 cm); and wherein the cover factor of the woven fabric in the weft direction satisfies the following formula:

[Fineness of weft (dtex)$^{1/2}$]×Weaving density of weft (numbers of weft/2.54 cm).

2. The hose for introduction and distribution of inflator gas according to claim 1, wherein the relation between the width (L cm) of said non-tubular portion and the area (S cm$^2$) of said adjacent distributing hole satisfies the following formula:

$$2(S^{1/2}) \geq L \geq 0.3(S^{1/2}).$$

3. The hose for introduction and distribution of inflator gas according to claim 1, wherein total fineness of the warp and weft constituting the hose is 110 dtex to 1,400 dtex and wherein single yarn fineness of the warp and weft constituting the hose is not more than 8 dtex.

4. The hose for introduction and distribution of inflator gas according to claim 1, wherein the hose is coated with rubber or synthetic resin, and wherein the coating amount is less than 25% by weight to the weight of the hose.

* * * * *